United States Patent
Foenss

(10) Patent No.: US 10,596,502 B2
(45) Date of Patent: Mar. 24, 2020

(54) FILTER ELEMENT AND DIRT SUCTION DEVICE WITH FILTER RECEPTACLE FOR SUCH A FILTER ELEMENT

(71) Applicant: Nilfisk A/S, Broendby (DK)

(72) Inventor: Anders Foenss, Gistrup (DK)

(73) Assignee: NILFISK A/S, Broendby (DK)

(*) Notice: Subject to any disclaimer, the term of this patent is extended or adjusted under 35 U.S.C. 154(b) by 217 days.

(21) Appl. No.: 15/496,456

(22) Filed: Apr. 25, 2017

(65) Prior Publication Data
US 2017/0304759 A1 Oct. 26, 2017

(30) Foreign Application Priority Data

Apr. 25, 2016 (DE) .......................... 10 2016 005 007

(51) Int. Cl.
| | | |
|---|---|---|
| A47L 9/12 | (2006.01) | |
| B01D 46/00 | (2006.01) | |
| B01D 46/10 | (2006.01) | |
| B01D 46/52 | (2006.01) | |
| A47L 9/10 | (2006.01) | |

(52) U.S. Cl.
CPC ............ *B01D 46/0005* (2013.01); *A47L 9/10* (2013.01); *A47L 9/122* (2013.01); *B01D 46/10* (2013.01); *B01D 46/521* (2013.01); *B01D 2271/022* (2013.01); *B01D 2271/027* (2013.01); *B01D 2279/55* (2013.01)

(58) Field of Classification Search
CPC ..... A47L 9/10; A47L 9/122; B01D 2271/022; B01D 2271/027; B01D 2279/55; B01D 46/0005; B01D 46/10; B01D 46/521
See application file for complete search history.

(56) References Cited

U.S. PATENT DOCUMENTS

| | | | | |
|---|---|---|---|---|
| 5,888,442 A | * | 3/1999 | Kometani ............ | B01D 39/163 264/296 |
| 6,293,984 B1 | * | 9/2001 | Oda ....................... | B01D 46/10 55/497 |

FOREIGN PATENT DOCUMENTS

| | | |
|---|---|---|
| DE | 202015101156 U1 | 3/2015 |
| DE | 102014007413 A1 | 11/2015 |
| EP | 0982062 A2 | 3/2000 |
| JP | 08-184297 A | 7/1996 |
| JP | 2007-269405 A | 10/2007 |
| WO | 2009/150165 A1 | 12/2009 |
| WO | 2013/104791 A1 | 7/2013 |

OTHER PUBLICATIONS

English Translation of Japanese Office Action for Japanese counterpart Application No. 2017-085093 dated Dec. 11, 2018.

* cited by examiner

*Primary Examiner* — Cabrena Holecek
(74) *Attorney, Agent, or Firm* — Browdy and Neimark, PLLC

(57) ABSTRACT

A filter element for a dirt suction device is provided, with a filter frame, on which a filter medium is attached, wherein on the filter frame, a continuous seal is arranged, the inner circumferential surface of which is arranged on an outer circumferential surface of the filter frame and has a section that radially protrudes over the filter frame, wherein a groove is arranged on a front side of the protruding section of the seal, and that a sealing surface is arranged on the opposite front side of the protruding section of the seal.

14 Claims, 3 Drawing Sheets

FILTER ELEMENT AND DIRT SUCTION DEVICE WITH FILTER RECEPTACLE FOR SUCH A FILTER ELEMENT

FIELD

The invention relates to a filter element for a dirt suction device as well as a dirt suction device with filter receptacle for such a filter element according to the preamble of the independent patent claims.

BACKGROUND

DE 20 2015 101 156 U1 discloses such a filter element for a dirt suction device with a filter frame, on which a filter medium is attached, wherein a continuous seal is arranged on the filter frame, the inner circumferential surface of the seal being arranged on an outer circumferential surface of the filter frame. The seal has a section that protrudes radially over the filter frame.

Such filter elements can, for example, be designed so as to be rectangular or also round and are used particularly for household suction devices for suctioning wet or dry dirt. As a rule, the dirt suction device is designed such that the filter element can be very easily replaced.

Other dirt suction devices have a so-called cleaning function. When the filter is clogged with dirt, the suction flow is reversed, and so the dirt particles adhering to the filter element are blown off the filter element and drop into the dirt container, which can then be emptied.

Other cleaning methods operate mechanically, wherein the filter is scraped or shaken. For this cleaning method, the filter element must essentially be designed so as to be stable, and particularly the filter material, for example a filter fleece, must be durable and long-lasting.

Replaceable paper filters or filter fleeces made of plastic are used as filter materials.

Since the filter material of a filter element with filter frame is more stable and durable than, for example, simple paper filters, the weight and the mass of the filter element is also relatively high, and so the filter element inserted in the dirt suction device is subject to greater mechanical stress and wear.

In particular, the filter element must be sealed with respect to the filter receptacle and the dirt suction device, and so no external air can pass the filter element unfiltered.

Particularly, the seal of the filter element is mechanically highly stressed during suction and cleaning operation.

In case of dirt suction devices for wet operation, it must also be ensured that the sealing of the filter element is also guaranteed during wet operation.

SUMMARY

The problem addressed by the present invention is thus that of providing a filter element for a dirt suction device, which is resistant to mechanical stress, has a good sealing effect and mechanical durability of the seal, and is easily and securely insertable in the filter receptacle of the dirt suction device.

For the solution to this problem, a filter element and a dirt suction device according to the features of the independent patent claims are proposed.

The filter element according to the invention is characterized in that a groove is arranged on a front side of the radially protruding section of the seal of the filter element, and that a sealing surface is arranged on the opposite front side of the radially protruding section of the seal.

The filter element according to the invention can be used in a corresponding dirt suction device with filter receptacle according to the invention.

The filter receptacle of the dirt suction device has a lower part with a sealing surface and an upper part with a sealing surface, wherein the filter element is retained between the sealing surfaces of the lower part and the upper part by means of the protruding section of the seal.

A groove is arranged on a front side of the projecting section of the seal of the filter element, wherein the sealing surface of the lower part of the filter receptacle engages in said groove.

On the opposite front side of the protruding section of the seal of the filter element, a further sealing surface is arranged which bears against the sealing surface of the upper part of the filter receptacle.

The seal of the filter element protrudes radially over the filter frame of the filter element. This radially protruding section of the seal comprises the groove and the profiled sealing surface. The sealing surface and the groove are thus radially arranged outside of the filter frame.

According to a preferred embodiment of the invention, the sealing surface of the seal of the filter element is designed so as to be profiled and has at least one rib protruding from the sealing surface. According to the invention, a plurality of such ribs can also be arranged adjacent to one another on the sealing surface of the seal.

This rib is designed so as to be continuous and extends over the entire sealing surface of the seal of the filter element.

The rib can, for example, have a triangular cross-section with an upward directed tip which is preferably rounded. However, the rib can also have a square or rectangular or other suitable cross-section, which has a good sealing effect on the opposite sealing surface of the upper part of the filter receptacle.

The radially protruding section of the seal of the filter element is relatively large and particularly suitable for the correct positioning of the filter element in the filter receptacle.

Due to the groove in the lower front side of the protruding section of the seal, the sealing element can be precisely positioned on an edge formed by the lower part of the filter receptacle, wherein the edge engages in the groove of the seal with a sealing surface and is thus sealingly positioned.

However, the protruding section of the seal also ensures that there is less wear of the seal during the suction operation and filter cleaning because, due to the protruding section, particularly the groove, the filter is held in position, particularly under the influence of horizontal forces which are acting on the filter element during cleaning and suction operation.

In addition to the groove and the rib or groove, the seal has a preferably rectangular cross-section. However, the seal can also have an oval, triangular, or another suitable cross-section.

According to a further preferred embodiment of the invention, the upper sealing surface of the seal can be designed so as to be profiled and have at least one continuous groove instead of a continuous rib. A plurality of continuous grooves can also be present.

Correspondingly, the opposite sealing surface of the upper part of the filter receptacle has a continuous groove which sealingly engages in the continuous groove of the seal of the filter element.

In order to absorb the mechanical forces applied by the filter receptacle to the seal, the rib or groove of the sealing surface of the seal is preferably arranged directly opposite the groove of the seal.

As a result, the forces applied to the seal by the lower part of the filter receptacle and the upper part of the filter receptacle lie directly in the same line and do not result in shearing forces which could damage or improperly deform the seal.

The filter medium of the filter element is preferably a filter fleece which, for example, is designed as pleated filter. However, a flat filter medium can also be used. The filter medium can be made of paper or plastic.

On the upper part of the filter receptacle, a separate seal can be arranged, which forms the sealing surface of the upper part of the filter receptacle.

According to a preferred embodiment of the dirt suction device according to the invention, the sealing surface of the seal is designed so as to be profiled and has at least one rib protruding from the sealing surface, wherein the rib of the sealing surface of the rib bears against the sealing surface of the upper part of the filter receptacle.

In a particular embodiment of the invention, the sealing surface of the upper part of the filter receptacle can be profiled and have at least one groove provided in the sealing surface, wherein the rib of the seal of the filter element engages in the groove of the sealing surface of the upper part.

According to a further embodiment of the dirt suction device, the sealing surface of the upper part of the filter receptacle is profiled and has at least one rib protruding from the sealing surface, wherein the rib of the sealing surface of the upper part bears against the sealing surface of the seal of the filter element.

In a specific embodiment, it can be provided that the sealing surface of the seal of the filter element is designed so as to be profiled and has at least one groove, wherein the rib of the sealing surface of the upper part engages in the groove of the seal of the filter element.

The seal of the filter element is preferably made of a water- and solvent-resistant material with good abrasion and wear properties, such as rubber or a rubber-like material, PU foam, or the like.

BRIEF DESCRIPTION OF THE DRAWINGS

In the following, the invention shall be described using the drawings and a preferred embodiment.

The drawings and their description shall result in further features and advantages of the invention.

DETAILED DESCRIPTION

Figure 1:
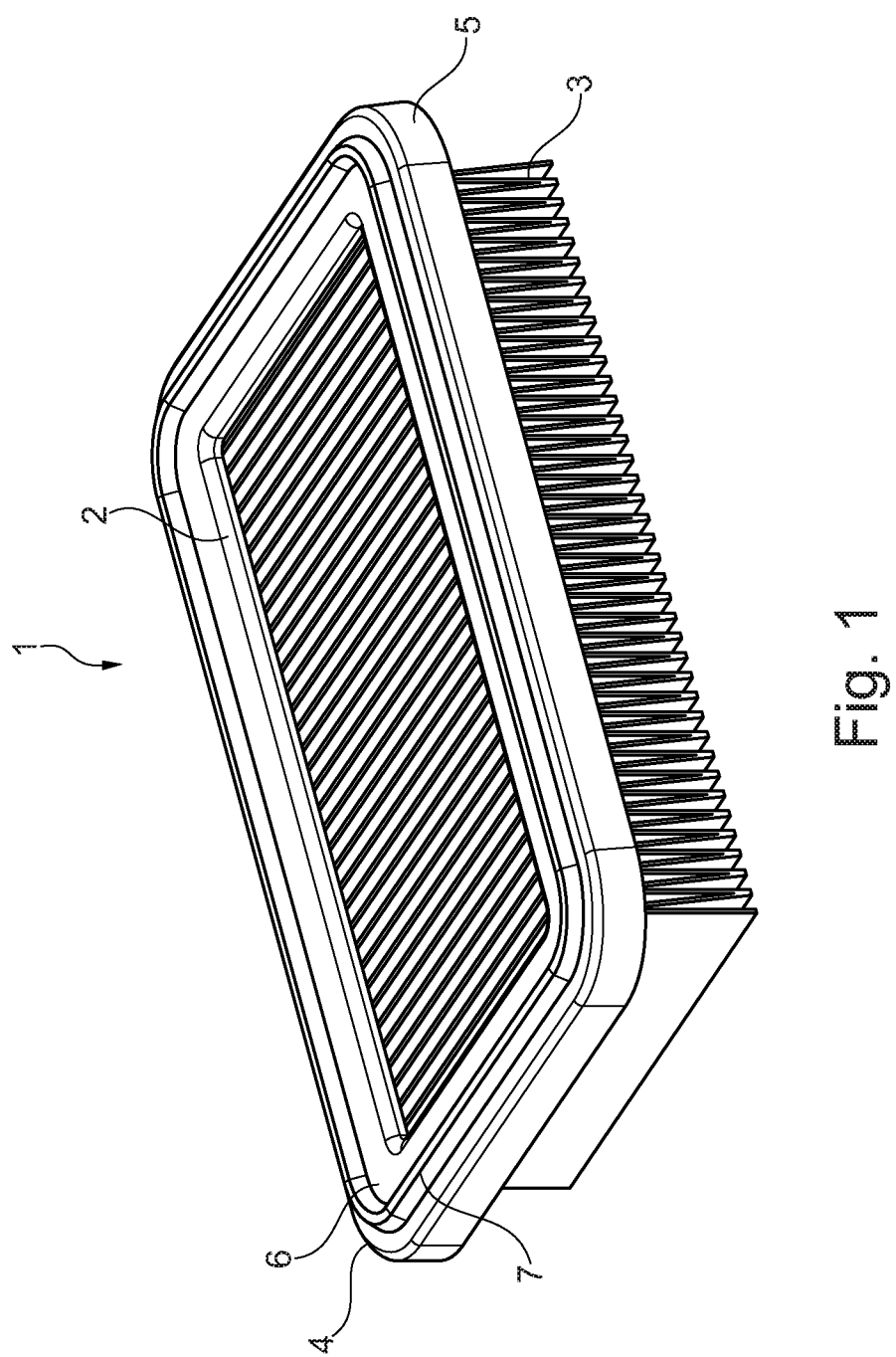
FIG. 1 shows a view of a filter element according to the invention.

FIG. 1 shows a perspective view of the filter element 1 according to the invention. For example, the filter element 1 has a rectangular filter frame 2 on which a filter medium 3 is attached. The filter frame can, for example, be made of plastic and/or metal.

The filter medium 3 can, for example, be designed as pleated filter which is made of a paper or plastic fleece.

Such a filter element 1, for example, is to be installed in a filter receptacle of a dirt suction device. A replacement of the filter element 1 is supposed to be quick and simple.

For sealing the filter element 1 with respect to the filter receptacle, a continuous seal 4 is arranged on the outer edge of the filter frame 2 which is made of a rubber-like material or a soft plastic. The corners 5 of the seal 4 are preferably rounded.

The seal 4 has an upper sealing surface 6. On the upper sealing surface 6, a continuous rib 7 is provided which ensures particularly good sealing with respect to the filter receptacle, as will be described in the following.

Figure 2:
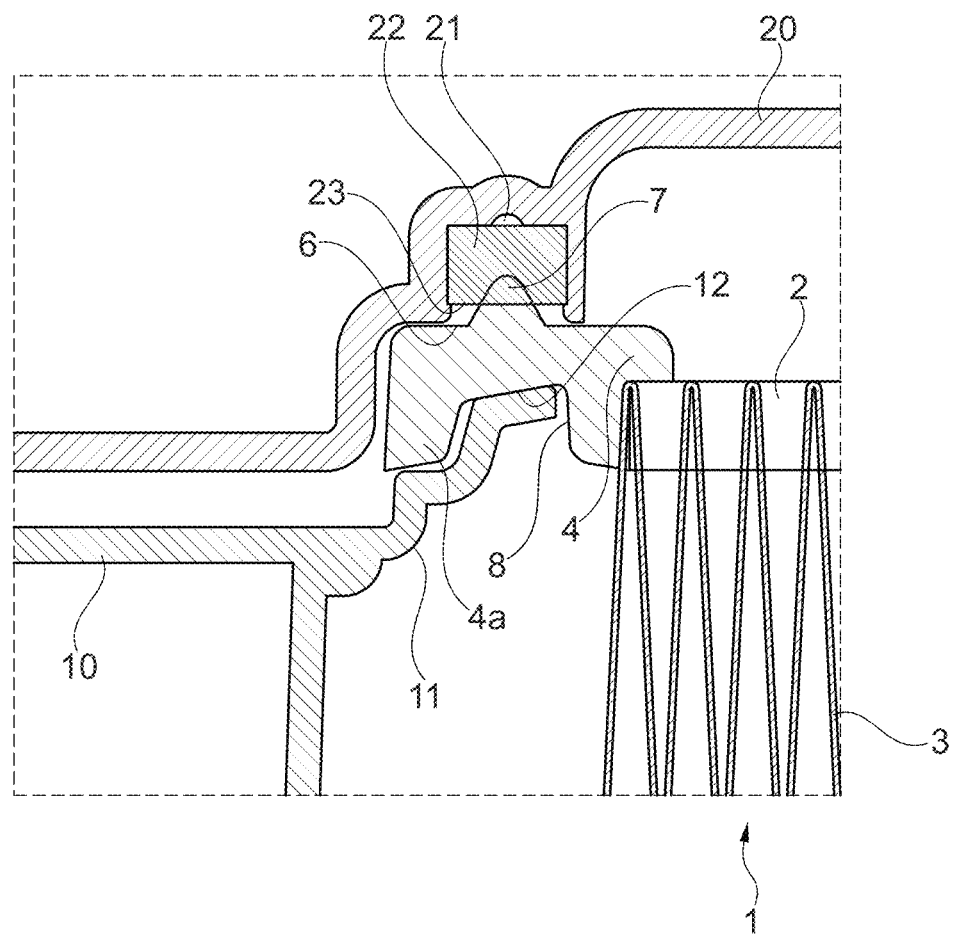
FIG. 2 shows a partial section of the upper part and the lower part of the filter receptacle with the filter element arranged between said parts.

FIG. 2 shows a partial section of the arrangement of the filter element 1 and the filter receptacle.

Depicted are the filter element 1 with the filter frame 2 and the filter medium 3. The seal 4 is attached to the edge of the filter frame 2.

With an inner circumferential surface, the seal 4 bears against an outer circumferential surface of the filter frame 2, and rests on the upper side of the filter frame 2.

The seal 4, for example, is injection-molded onto the filter frame 2, resulting in a secure and tight connection between the filter frame 2 and the seal 4.

According to the invention, the seal 4 forms a radial protrusion 4a over the filter frame 2. The radially protruding section 4a of the seal 4 extends radially over the edge of the filter frame 2 approximately into the plane of the filter frame 2.

On its lower end face, the protruding section 4a of the seal 4 has a groove 8. On its upper end face, the protruding section 4a of the seal 4 has a sealing surface 6.

On the upper sealing surface 6 of the seal 4, a rib 7 is arranged which protrudes upwardly from the sealing surface.

The filter receptacle, for example, consists of a lower part 10 and an upper part 20. For installing or replacing the filter element 1, the upper part 20 can be separated from the lower part 10 by folding away or lifting said upper part 20.

The lower part 10 of the filter receptacle has a continuous edge 11, which is inwardly oriented and forms an approximately horizontally extending sealing surface 12 on its outer section.

The filter element 1 is inserted in the lower part 10 of the filter receptacle such that the outer edge of the filter receptacle 10 engages with the sealing surface 12 in the groove 8 of the seal 4 of the filter element 1.

The sealing surface 12 of the lower part 10 of the filter receptacle thus bears against the floor surface of the groove 8 of the seal 4 of the filter element 1. This results in a mechanically stable and particularly sealing positioning of the filter element 1 on the lower part 10 of the filter receptacle.

Once the filter element 1 is positioned on the lower part 10 of the filter receptacle, the upper part 20 of the filter receptacle can be placed on and fastened to the lower part 10.

The upper part 20 of the filter receptacle has a groove 21 which is positioned axially opposite the upper sealing surface 6 of the seal 4 of the filter element 1. In the groove 21 of the upper part 20 of the filter receptacle, a seal 22 is preferably arranged, said seal 20 being made of the rubber-like material or a soft plastic.

When the filter element 1 is arranged in the filter receptacle 10, 20, the upward protruding rib 7 of the seal 4 of the filter element is pressed against the lower sealing surface 23 of the seal 22 of the upper part 20. The rib 7 of the seal 4 can to some extent deform the elastic sealing surface 23 of the seal 4, resulting in a mechanically stable and good sealing between the seal 22 of the upper part 20 of the filter receptacle and the seal 4 of the filter element 1.

The mechanical forces, which are exerted by the upper part 20 onto the seal 4 of the filter element 1 and the sealing surface 12 of the lower part 10 of the filter receptacle, run along a vertically, i.e. axially extending line. As a result, the seal 4 of the filter element 1 is retained mechanically stable between the lower part 10 and the upper part 20 of the filter receptacle.

In particular, no shearing forces or lateral forces act on the seal 4, which could improperly deform the seal 4 of the filter element 1 and thus result in mechanical stress or excessive wear.

The mechanical stress on the seal 4 during the operation of the dirt suction device and during the cleaning process of the filter element 1 remains low.

An important feature of the invention is that of the seal 4 protruding radially over the filter element 1, so that the attachment of the seal 4 on the filter element and the sealing surfaces for sealing on the filter receptacle 10, 20 are independent of one another.

Figure 3:
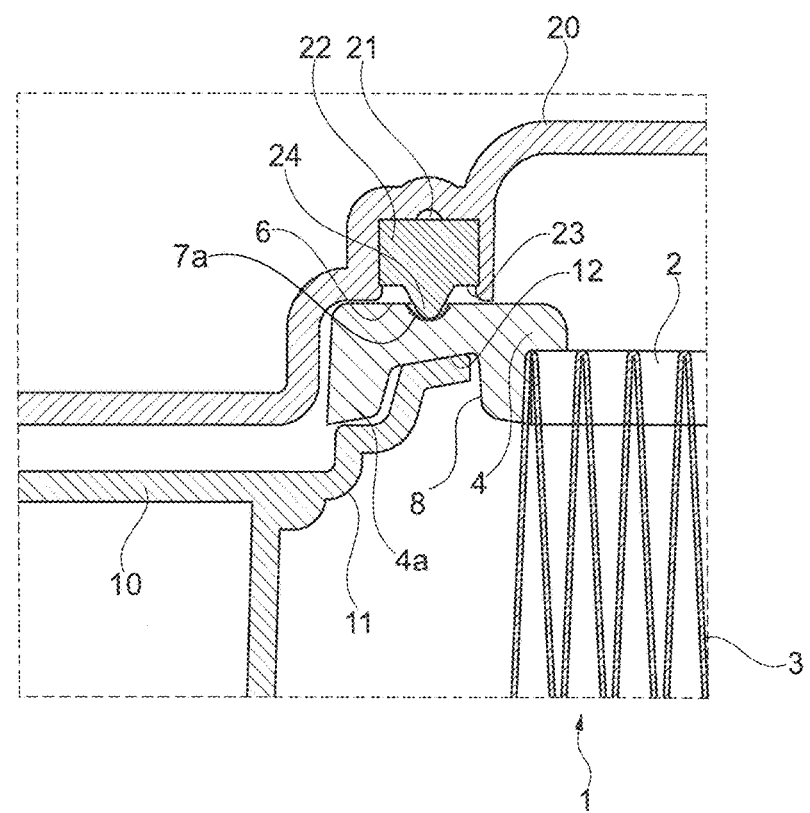
FIG. 3 shows a design of the upper part and the lower part of the filter receptacle with the filter element arranged between said parts, which is modified when compared to FIG. 2.

FIG. 3 shows a design which is modified when compared to FIG. 2, wherein the same components are denoted with the same reference signs.

Essentially, the description of FIG. 2 applies to FIG. 3.

Contrary to FIG. 2, the upper sealing surface 6 of the seal 4 of the filter element 1 has no rib but is designed as an essentially planar sealing surface 6.

The seal 22, which is arranged in the groove 21 of the upper part 20 of the filter receptacle, has a downward directed rib 24 which points in the direction of the sealing surface 6 of the filter element 1.

When the filter element 1 is arranged in the filter receptacle 10, 20, the rib 24 of the seal 25 is pressed against the upper sealing surface 6 of the seal 4 of the filter element 1. The rib 24 of the seal 25 can to some extent deform the elastic sealing surface 6 of the seal 4, resulting in a good sealing between the seal 22 of the filter receptacle and the seal 4 of the filter element 1.

In FIG. 2, it can be provided that the seal 22 of the upper part 20 of the filter receptacle has a groove (not depicted) which is arranged above the rib 7 of the seal 4 of the filter element 1. When the upper part 20 of the filter receptacle is installed, the rib 7 of the seal 4 of the filter element 1 engages in the groove of the seal 22 of the upper part 20, thus resulting in a good sealing effect.

This can similarly also be provided in FIG. 3, wherein a groove (not depicted) can be arranged in the sealing surface 6 of the seal 4 opposite the rib 24 of the seal 22 of the upper part of the filter receptacle.

LIST OF REFERENCE SIGNS

1 Filter element
2 Filter frame
3 Filter medium
4 Seal
4a Protruding section
5 Corner
6 Sealing surface
7 Rib
8 Groove
10 Lower part of the filter receptacle
11 Edge
12 Sealing surface
20 Upper part of the filter receptacle
21 Groove
22 Seal
23 Sealing surface
24 Rib

The invention claimed is:

1. A filter element for a dirt suction device comprising:
a filter frame,
a filter medium attached to the filter frame,
a continuous first seal arranged on the filter frame, the continuous first seal having an inner circumferential surface arranged on an outer circumferential surface of the filter frame and a protruding section that radially protrudes over the filter frame,
a groove arranged on a front side of the protruding section of the first seal,
a first sealing surface arranged on an opposite front side of the protruding section of the first seal, and
a second seal arranged at an upper part of a filter receptacle and forming a second sealing surface,
wherein the first sealing surface is pressed on the second sealing surface, and
wherein a lower sealing surface of a lower part of the filter receptacle engages in the groove of the filter element.

2. The filter element according to claim 1, wherein the sealing surface of the seal is profiled and has at least one continuous rib which protrudes from the sealing surface.

3. The filter element according to claim 1, the sealing surface of the seal is profiled and has at least one continuous groove defined in the sealing surface.

4. The filter element according to claim 2, wherein the at least one continuous rib of the sealing surface of the seal is arranged axially opposite the groove of the seal.

5. The filter element according to claim 3, wherein the at least one continuous groove of the first sealing surface of the first seal is arranged axially opposite the groove of the first seal.

6. The filter element according to claim 1, wherein the filter medium consists of a filter fleece.

7. The filter element according to claim 1, wherein the filter medium is a pleated filter or a flat filter.

8. A dirt suction device comprising:
a filter receptacle,
wherein the filter receptacle comprises
a lower part having a first sealing surface, and
an upper part having a second sealing surface, and
a replaceable filter element,
wherein the replaceable filter element comprises
a filter frame,
a filter medium attached to the filter frame,
a continuous first seal arranged on the filter frame, the continuous first seal having an inner circumferential surface arranged on an outer circumferential surface of the filter frame and a protruding section that radially protrudes over the filter frame,
a first groove arranged on a front side of the protruding section of the first seal of the filter element, wherein the first sealing surface of the lower part of the filter receptacle engages in the first groove of the filter element,
a third sealing surface, bearing against the second sealing surface of the upper part, arranged on an opposite front side of the protruding section of the first seal, and a second seal arranged at an upper part of the dirt suction device and forming the second sealing surface, the third sealing surface being pressed on the second sealing surface, wherein the filter element is retained between the first and second sealing surfaces, wherein the third sealing surface is profiled and has at least one rib or groove provided in the third sealing surface, and wherein at least rib or groove of the first seal engages in the at least one groove or rib of the third sealing surface.

9. The dirt suction device according to claim 8, wherein the second seal is arranged on the upper part of the filter receptacle to form the sealing surface.

10. The dirt suction device according to claim 8, wherein the first sealing surface is profiled and comprises the at least one rib which protrudes from the first sealing surface.

11. The dirt suction device according to claim 8, wherein the at least one rib (24) of the second sealing surface bears against the first sealing surface.

12. The dirt suction device according to claim 11, wherein the first sealing surface of the seal of the filter element is profiled and has at least one groove, wherein the at least one rib of the second sealing surface engages in the at least one groove of the first seal.

13. The dirt suction device according to claim 8, wherein the filter medium is a filter fleece.

14. The dirt suction device according to claim 8, wherein the filter medium is a pleated filter or a flat filter.

* * * * *